United States Patent
Kumar et al.

(10) Patent No.: US 10,781,127 B2
(45) Date of Patent: *Sep. 22, 2020

(54) GLASS-COVERED VEHICLE INTERIOR SYSTEMS AND METHODS FOR FORMING THE SAME

(71) Applicant: CORNING INCORPORATED, Corning, NY (US)

(72) Inventors: Atul Kumar, Horseheads, NY (US); William Michael Seiderman, Corning, NY (US); Yawei Sun, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 191 days.

This patent is subject to a terminal disclaimer.

(21) Appl. No.: 15/848,355

(22) Filed: Dec. 20, 2017

(65) Prior Publication Data

US 2018/0186674 A1     Jul. 5, 2018

Related U.S. Application Data

(60) Provisional application No. 62/440,641, filed on Dec. 30, 2016.

(51) Int. Cl.
  *C03B 23/023*  (2006.01)
  *B60K 37/04*  (2006.01)
  *B60R 13/02*  (2006.01)

(52) U.S. Cl.
  CPC ............ *C03B 23/023* (2013.01); *B60K 37/04* (2013.01); *B60R 13/02* (2013.01); *B60K 2370/693* (2019.05)

(58) Field of Classification Search
  CPC ........ B32B 17/10036; B32B 17/10889; B32B 17/10018; B32B 17/00; G06F 3/0412;
  (Continued)

(56) References Cited

U.S. PATENT DOCUMENTS

| | | |
|---|---|---|
| 4,455,338 A | 6/1984 | Henne |
| 4,899,507 A | 2/1990 | Mairlot |

(Continued)

FOREIGN PATENT DOCUMENTS

| | | |
|---|---|---|
| CN | 203825589 U | 9/2014 |
| CN | 102566841 B | 4/2015 |

(Continued)

OTHER PUBLICATIONS

International Search Report and Written Opinion PCT/US2017/067381 dated Mar. 27, 2018.

*Primary Examiner* — Catherine A. Simone
(74) *Attorney, Agent, or Firm* — Payal A. Patel

(57) ABSTRACT

Embodiments of a vehicle interior system are disclosed. In one or more embodiments, the system includes a base with a curved surface, and a cold-formed glass substrate removably disposed on the curved surface, wherein the curved surface and the glass substrate each have a radius of curvature within 10% of one another. The base may include a center console, a dashboard, an arm rest, a pillar, a seat back, a floor board, a headrest, a door panel, or a steering wheel. In one or more embodiments, the curved surface includes a display, and the glass substrate is disposed at least partially over the display. Methods for forming such systems are also disclosed.

19 Claims, 8 Drawing Sheets

(58) Field of Classification Search
CPC ..... G06F 1/13338; B60K 37/04; B60R 13/02;
C03B 23/023
See application file for complete search history.

(56) References Cited

U.S. PATENT DOCUMENTS

| | | | |
|---|---|---|---|
| 4,985,099 A | 1/1991 | Mertens et al. | |
| 6,086,983 A | 7/2000 | Yoshizawa | |
| 6,332,690 B1 | 12/2001 | Murofushi | |
| 6,582,799 B1 | 6/2003 | Brown et al. | |
| 7,375,782 B2 | 5/2008 | Yamazaki et al. | |
| 8,344,369 B2 | 1/2013 | Yamazaki et al. | |
| 8,549,885 B2 | 10/2013 | Dannoux et al. | |
| 8,833,106 B2 | 9/2014 | Dannoux et al. | |
| 8,912,447 B2 | 12/2014 | Leong et al. | |
| 9,061,934 B2 | 6/2015 | Bisson et al. | |
| 9,593,042 B2 | 3/2017 | Hu et al. | |
| 9,802,485 B2 | 10/2017 | Masuda et al. | |
| 9,895,975 B2 | 2/2018 | Lee et al. | |
| 9,902,640 B2 | 2/2018 | Dannoux et al. | |
| 9,931,817 B2 | 4/2018 | Rickerl | |
| 10,131,118 B2 | 11/2018 | Kang et al. | |
| 10,175,802 B2 * | 1/2019 | Boggs | B32B 17/10036 |
| 2007/0223121 A1 | 9/2007 | Franck et al. | |
| 2009/0179840 A1 | 7/2009 | Tanaka et al. | |
| 2009/0185127 A1 | 7/2009 | Tanaka et al. | |
| 2010/0031590 A1 | 2/2010 | Buchwald et al. | |
| 2012/0202030 A1 | 8/2012 | Kondo et al. | |
| 2013/0088441 A1 | 4/2013 | Chung et al. | |
| 2015/0246507 A1 | 9/2015 | Brown et al. | |
| 2016/0083282 A1 * | 3/2016 | Jouanno | B32B 17/061 156/102 |
| 2016/0250982 A1 | 9/2016 | Fisher et al. | |
| 2016/0259365 A1 * | 9/2016 | Wang | G06F 1/1601 |
| 2016/0297176 A1 | 10/2016 | Rickerl | |
| 2016/0306451 A1 | 10/2016 | Isoda et al. | |
| 2016/0375808 A1 | 12/2016 | Etienne et al. | |
| 2017/0008377 A1 | 1/2017 | Fisher et al. | |
| 2017/0021661 A1 | 1/2017 | Pelucchi | |
| 2017/0327402 A1 | 11/2017 | Fujii et al. | |
| 2017/0349473 A1 | 12/2017 | Moriya et al. | |
| 2018/0050948 A1 | 2/2018 | Faik et al. | |
| 2018/0111569 A1 | 4/2018 | Faik et al. | |
| 2018/0147985 A1 | 5/2018 | Brown et al. | |
| 2018/0149777 A1 | 5/2018 | Brown | |
| 2018/0149907 A1 | 5/2018 | Gahagan et al. | |
| 2018/0188869 A1 | 7/2018 | Boggs et al. | |
| 2018/0210118 A1 | 7/2018 | Gollier et al. | |
| 2018/0245125 A1 | 8/2018 | Tsai et al. | |

FOREIGN PATENT DOCUMENTS

| | | |
|---|---|---|
| CN | 104679341 A | 6/2015 |
| CN | 204463066 U | 7/2015 |
| CN | 104843976 A | 8/2015 |
| CN | 105511127 A | 4/2016 |
| DE | 4415878 A1 | 11/1995 |
| DE | 102004022008 A1 | 12/2004 |
| DE | 102013214108 A1 | 2/2015 |
| FR | 2918411 A1 | 9/2009 |
| GB | 2011316 A | 7/1979 |
| JP | 3059337 U | 6/1991 |
| JP | 2015092422 A | 5/2015 |
| JP | 2016031696 A | 3/2016 |
| JP | 05976561 B2 | 8/2016 |
| JP | 2016173794 A | 9/2016 |
| JP | 2016203609 A | 12/2016 |
| WO | 1998001649 A1 | 1/1998 |
| WO | 2007108861 A1 | 9/2007 |
| WO | 2012058084 A2 | 5/2012 |
| WO | 2015031594 A2 | 3/2015 |
| WO | 2016007815 A1 | 1/2016 |
| WO | 2016044360 A1 | 3/2016 |
| WO | 2016196531 A1 | 12/2016 |
| WO | 2016196546 A1 | 12/2016 |
| WO | 2017155932 A1 | 9/2017 |
| WO | 2018005646 A1 | 1/2018 |
| WO | 2018009504 A1 | 1/2018 |
| WO | 2018075853 A1 | 4/2018 |
| WO | 2018081068 A1 | 5/2018 |
| WO | 2018125683 A1 | 7/2018 |

* cited by examiner

GLASS-COVERED VEHICLE INTERIOR SYSTEMS AND METHODS FOR FORMING THE SAME

CROSS-REFERENCE TO RELATED APPLICATIONS

This application claims the benefit of priority under 35 U.S.C. § 119 of U.S. Provisional Application Ser. No. 62/440,641 filed on Dec. 30, 3016, the content of which is relied upon and incorporated herein by reference in its entirety.

BACKGROUND

The disclosure relates to vehicle interior systems including glass and methods for forming the same, and more particularly to vehicle interior systems including a curved surface covered with a cold-formed glass substrate and methods for forming the same.

Vehicle interiors include curved surfaces and can incorporate displays in such curved surfaces. The materials used to form such curved surfaces are typically limited to polymers, which do not exhibit the durability and optical performance as glass. As such, curved glass substrates are desirable, especially when used as covers for displays. Existing methods of forming such curved glass substrates, such as thermal forming, have drawbacks including high cost, optical distortion, and surface marking. Accordingly, there is a need for vehicle interior systems that can incorporate a curved glass substrate in a cost-effective manner. In addition, there is a commercial demand for vehicles and vehicle interiors that are readily customizable, while still retaining the superior finishes offered by glass. Accordingly, there is also a need for such vehicle interior systems that can incorporate customizable and interchangeable curved glass substrates.

SUMMARY

A first aspect of this disclosure pertains to a vehicle interior system including a base including a curved surface, and a cold-formed glass substrate removably disposed on the curved surface, wherein the curved surface and the glass substrate each have a radius of curvature within 10% of one another. In one or more embodiments, the base comprises any one of a center console, a dashboard, an arm rest, a pillar, a seat back, a floor board, a headrest, a door panel, and a steering wheel. In some embodiments, the curved surface comprises a display, and the glass substrate is disposed at least partially over the display. In one or more embodiments, the vehicle interior system includes an air gap between the cold-formed glass substrate and the curved surface.

The glass substrate may include a first major surface, a second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width. In some examples, the glass substrate has a thickness of about 1.5 mm or less. In some examples, the glass substrate has a width in a range from about 5 cm to about 250 cm. In some examples, the glass substrate has a length in a range from about 5 cm to about 250 cm. The glass substrate may be strengthened or may be unstrengthened (which may include annealed glass). In one or more embodiments, the vehicle interior system is disposed in any one of an automobile, a seacraft, and an aircraft.

As second aspect of this disclosure pertains to a method for forming a glass-covered vehicle interior system. In one or more embodiments, the method includes positioning a glass substrate over a curved surface of a base, wherein the curved surface comprises a first radius of curvature; curving the glass substrate to form a curved glass substrate comprising a second radius of curvature that is within 10% of the first radius of curvature; and temporarily securing the curved glass substrate to the curved surface. In one or more embodiments, the glass substrate comprises a softening point and curving the glass substrate and temporarily securing the curved glass substrate is performed at a cold-forming temperature that is less than the softening point of the glass substrate. The cold-forming temperature may be less than 500° C. In some embodiments, the cold-forming temperature is room temperature. In one or more embodiments, wherein curving the glass substrate comprising applying pressure to at least a portion of the glass substrate. In one or more embodiments, the method includes preserving an air gap between the glass substrate and the curved surface. In one or more embodiments, the method includes removing the curved glass substrate from the curved surface.

A second aspect of this disclosure pertains to a method for replacing a glass substrate in a glass-covered vehicle interior system. In one or more embodiments, the method includes providing a first glass-covered vehicle interior system comprising a first glass substrate that is temporarily secured to a curved surface of a base, wherein the curved surface comprises a first radius of curvature; removing the first glass substrate from the curved surface; positioning a second glass substrate over the curved surface; curving the second glass substrate to form a second curved glass substrate comprising a second radius of curvature that is within 10% of the first radius of curvature; and temporarily securing the second curved glass substrate to the curved surface. In one or more embodiments, the second glass substrate comprises a softening point and curving the second glass substrate and temporarily securing the second curved glass substrate is performed at a cold-forming temperature that is less than the softening point of the second glass substrate. In one or more embodiments, the method includes preserving an air gap between the second curved glass substrate and the curved surface.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to various embodiments, examples of which are illustrated in the accompanying drawings.

A first aspect of the instant application pertains to a vehicle interior system. The various embodiments of the vehicle interior system may be incorporated into vehicles such as trains, automobiles (e.g., cars, trucks, buses and the like), seacraft (boats, ships, submarines, and the like), and aircraft (e.g., drones, airplanes, jets, helicopters and the like).

Figure 1:
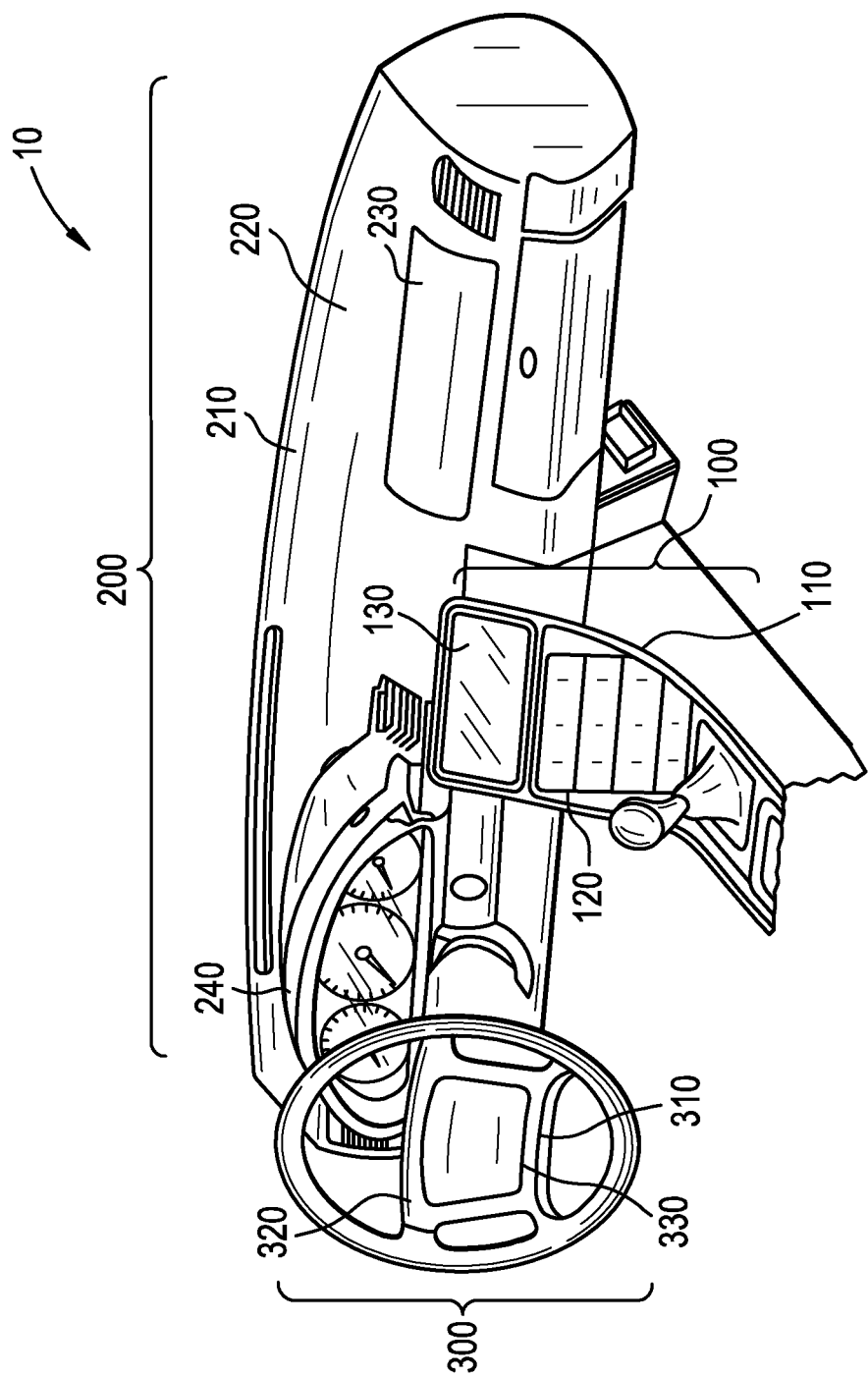
FIG. 1 is a perspective view of a vehicle interior with vehicle interior systems according to one or more embodiments.

FIG. 1 illustrates an exemplary vehicle interior 10 that includes three different embodiments of a vehicle interior system 100, 200, 300. Vehicle interior system 100 includes a center console base 110 with a curved surface 120, which may optionally include a display 130. Vehicle interior system 200 includes a dashboard base 210 with a curved surface 220. The dashboard base 210 typically includes an instrument panel 240 which may also include a curved surface. The dashboard base, and in some embodiments the instrument panel, may include a display 230. Vehicle interior system 300 includes a dashboard steering wheel base 310 with a curved surface 320, and an optional display 330. In one or more embodiments, the vehicle interior system may include base that is an arm rest, a pillar, a seat back, a floor board, a headrest, a door panel, or any portion of the interior of a vehicle that includes a curved surface.

The vehicle interior system 100, 200, 300 includes a cold-formed glass substrate that is disposed on the curved surface. In one or more embodiments, the glass substrate is removably disposed on the curved surface. As used herein, the term removably means the glass substrate is not permanently attached or bonded to the curved surface and thus, can be removed without damaging the underlying curved surface. In one or more embodiments, the cold-formed glass substrate is temporarily secured to the curved surface such that a peel force of 1 N/cm or greater (e.g., 1.5 N/cm or greater, 2 N/cm or greater, 2.5 N/cm or greater, 3 N/cm or greater, 3.5 N/cm or greater, 4 N/cm or greater, 4.5 N/cm or greater, or 5 N/cm or greater, is required to peel the glass substrate from the curved surface under Test Method F of ASTM D 3330 Test for Peel Adhesion of Pressure-Sensitive Adhesive Tapes. In one or more embodiments, the peel force required to peel the glass substrate from the curved surface is less than 20 N/cm, or less than about 10 N/cm.

In one or more embodiments, the glass substrate is cold-formed to have a curvature that matches the curvature of the curved surface 120, 220, 320. In one or more embodiments, the curved surface 120, 220, 320 has a radius of curvature in a range from about 50 mm to about 500 mm. As used herein, when the radius of curvature of the curved surface varies across the area on which the glass substrate is disposed, the radius of curvature referred to herein is the minimum radius of curvature of the curved surface on which the glass substrate is disposed. In one or more embodiments, the glass substrate is cold-formed and exhibits a radius curvature that is within 10% (e.g., about 10% or less, about 9% or less, about 8% or less, about 7% or less, about 6% or less, or about 5% or less) of the radius of curvature of the curved surface. For example, if the curved surface exhibits a radius of curvature of 195 mmm, the glass substrate is cold-formed to have a radius of curvature in a range from about 175.5 mm to about 214.5. In some embodiments, the radius of curvature of the curved surface may be in a range from about 50 mm to about 450 mm, from about 50 mm to about 400 mm, from about 50 mm to about 350 mm, from about 50 mm to about 300 mm, from about 50 mm to about 250 mm, from about 50 mm to about 240 mm, from about 50 mm to about 230 mm, from about 50 mm to about 220 mm, from about 50 mm to about 210 mm, from about 50 mm to about 200 mm, from about 50 mm to about 190 mm, from about 50 mm to about 180 mm, from about 50 mm to about 170 mm, from about 50 mm to about 160 mm, from about 50 mm to about 150 mm, from about 60 mm to about 250 mm, from about 70 mm to about 250 mm, from about 80 mm to about 250 mm, from about 90 mm to about 250 mm, from about 100 mm to about 250 mm, from about 110 mm to about 250 mm, from about 120 mm to about 250 mm, from about 130 mm to about 250 mm, from about 140 mm to about 250 mm, from about 150 mm to about 250 mm, from about 160 mm to about 250 mm, from about 170 mm to about 250 mm, from about 180 mm to about 250 mm, from about 190 mm to about 250 mm, or from about 200 mm to about 250 mm.

Figure 2:
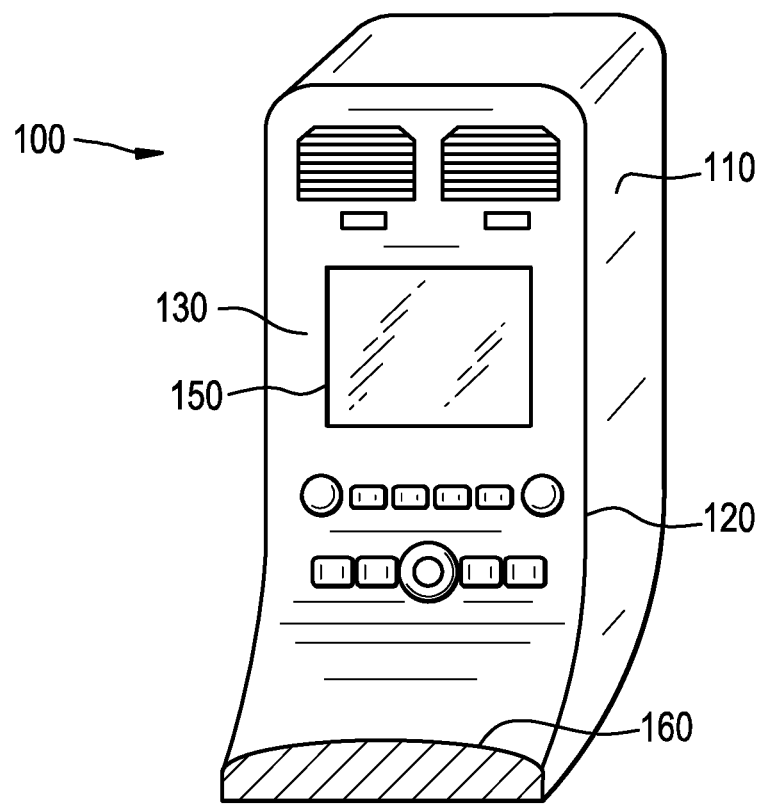
FIG. 2 is a front plane view of a vehicle interior system according to one or more embodiments.

In one or more embodiments, the curved surface 120, 220, 320 includes a display 130, 230, 330 as shown in FIG. 1 and the glass substrate is at least partially disposed over the display. In such embodiments, the glass substrate forms a cover glass over the display. In some embodiments, the display may include touch functionality and such functionality can be accessed through the glass substrate that at least partially covers the display. In some embodiments, the curved surface 110, 210, 310 may include touch functionality that is not associated with a display. In such embodiments, such functionality can be accessed through the glass substrate that covers the curved surface. FIG. 2 illustrates vehicle interior system 100 which includes a center console body 110 having a curved surface 120 having a curved surface and a display 130. The cold-formed glass substrate 150 is removably disposed on the curved surface and has a radius of curvature that is within 10% of the radius of curvature of the curved surface.

Figure 3A:
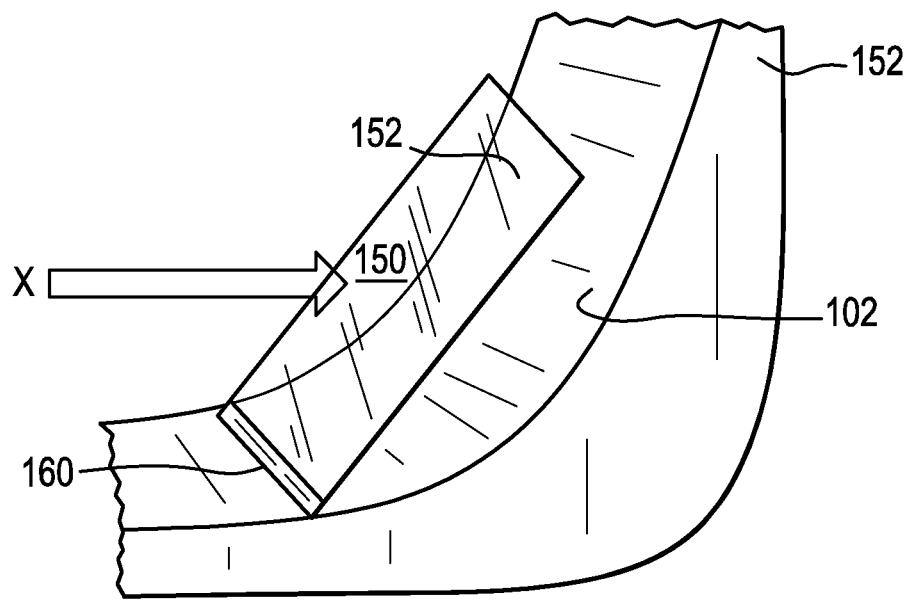
FIG. 3A is a side perspective view of the vehicle interior system of FIG. 2, before the glass substrate is removably disposed on the curved surface.
Figure 3B:
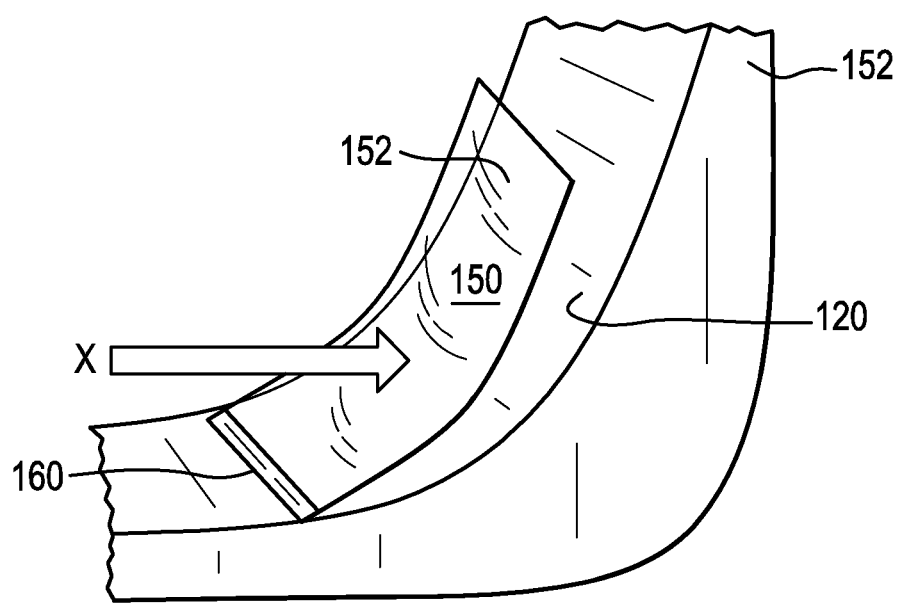
FIG. 3B is a side perspective view of the vehicle interior system of FIG. 3A, after as glass substrate is being removably disposed on the curved surface.

In one or more embodiments, the base 110 includes at least one recess 160. As shown in FIG. 3A, the glass substrate 150 is at least partially inserted into the recess 160 before it is removably disposed on the curved surface 120. FIG. 3B shows the glass substrate being curved and removably disposed on the curved surface. After the glass substrate is inserted into the recess 160, the glass substrate is cold-formed to have the curvature that matches the curved surface, as described herein.

Figure 4:
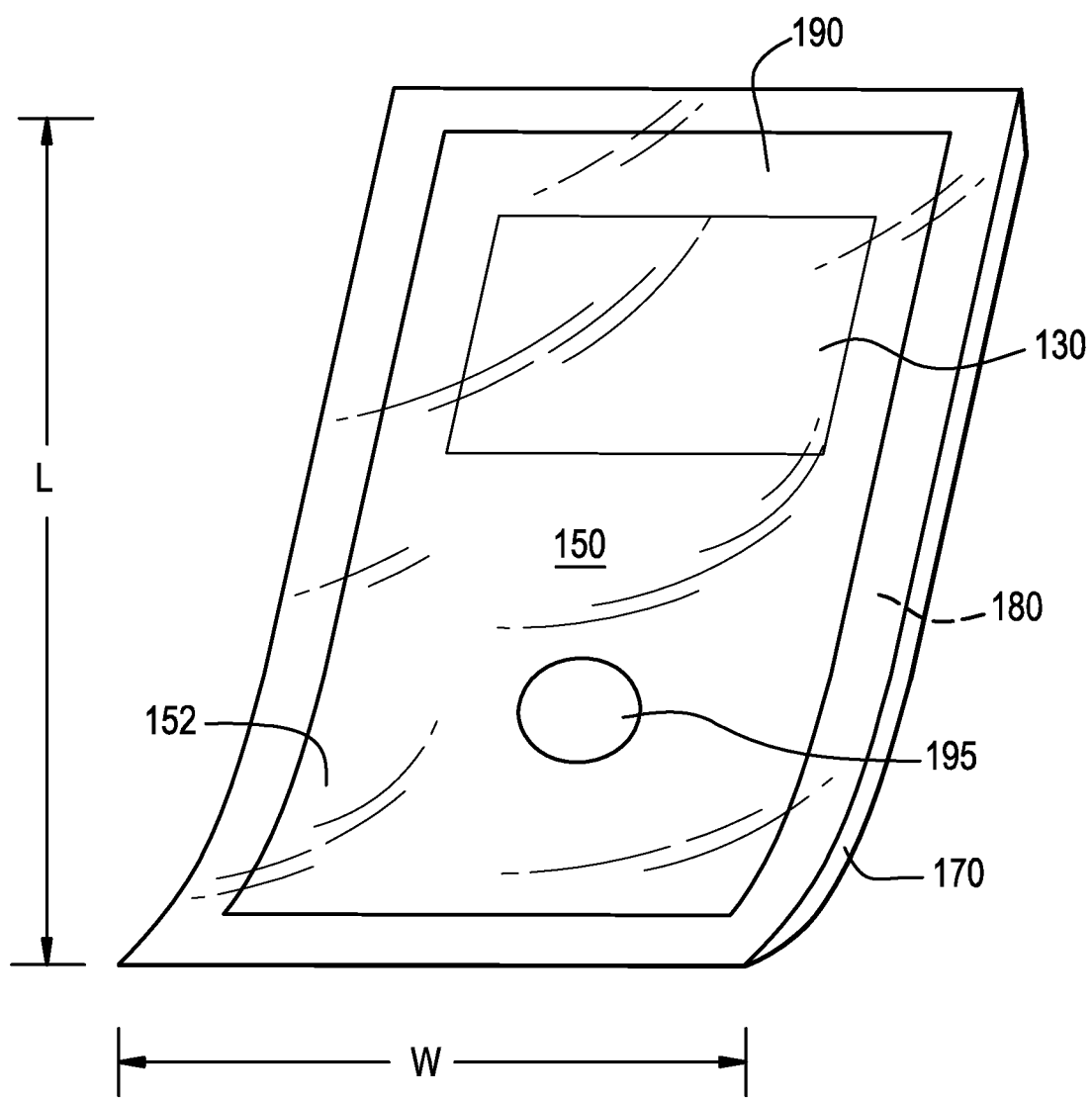
FIG. 4 is an illustration of a curved glass substrate according to one or more embodiments.
Figure 5:
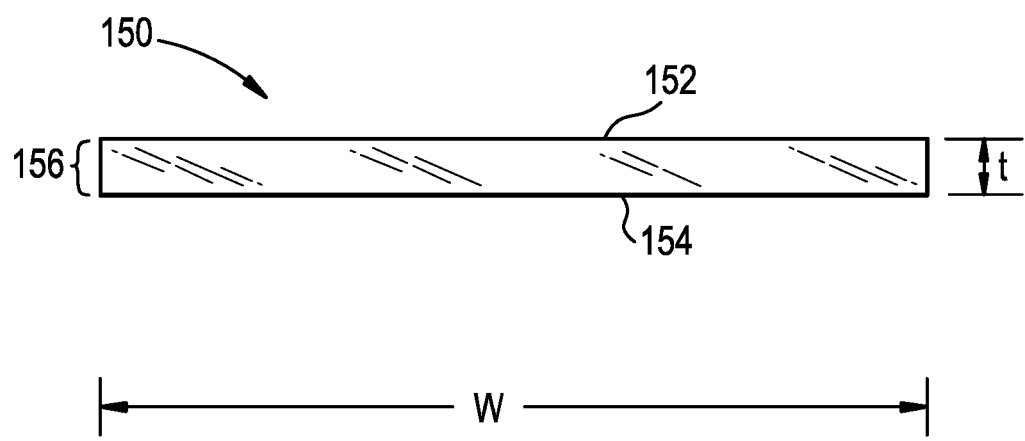
FIG. 5 is a side view illustration of the curved glass substrate of FIG. 4 before it is curved.

FIG. 4 shows the cold-formed glass substrate separated from the body. FIG. 5 is a side view of an exemplary glass substrate prior to being cold-formed. As shown in FIG. 4, the glass substrate is flat or planar prior to being cold-formed and includes a first major surface 152, a second major surface 154 opposing the first major surface and a minor surface 156 connecting the first major surface and the second major surface. In the embodiments described herein, the second major surface 154 is adjacent to the curved surface 120.

In one or more embodiments, the either one of or both the curved surface 120 and the glass substrate 150 includes an adhesive. The adhesive may be a pressure-sensitive adhesive facilitates the removably disposing the glass substrate on the curved surface. In one or more embodiments, as shown in FIG. 4, the adhesive 170 is disposed between the second major surface 154 and the curved surface 120. In one or more embodiments, the adhesive is disposed over the entire second major surface 154 or is disposed on the entire second major surface but not on portions of the second major surface that are disposed on the display (i.e., the display area is substantially free of the adhesive). In one or more embodiments, the second major surface comprises a periphery 180 extending from the minor surface 156 and surrounding an interior portion 190 of the second major surface of the glass substrate. In one or more embodiments, the adhesive may be disposed on at least a portion of the periphery 190 of the second major surface. As shown in FIG. 4, the display 130 is positioned at least partially within the interior portion 190 of the second major surface.

In one or more embodiments, the adhesive may be disposed on the curved surface. In one or more embodiments, the adhesive is disposed over the entire curved surface 120 or is disposed on the entire curved surface but not on the display (i.e., the display is substantially free of the adhesive). In some embodiments, the adhesive is disposed on the portions of the curved surface 120 surrounding the display.

In one or more embodiments, either one of or both the curved surface and the glass substrate are substantially free of any adhesive. In one or more embodiments, the vehicle interior system is substantially free of any adhesive. In such embodiments, the glass substrate is removably disposed on the curved surface by static electricity or by a mechanical force, as will be described below.

In the embodiment shown, the glass substrate has a thickness (t) that is substantially constant and is defined as a distance between the first major surface 152 and the second major surface 154. The thickness (t) as used herein refers to the maximum thickness of the glass substrate. In the embodiment shown, the glass substrate includes a width (W) defined as a first maximum dimension of one of the first or second major surfaces orthogonal to the thickness (t), and a length (L) defined as a second maximum dimension of one of the first or second surfaces orthogonal to both the thickness and the width.

In one or more embodiments, the glass substrate has a thickness (t) that is about 1.5 mm or less. For example, the thickness may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments, the glass substrate has a width in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the glass substrate has a length in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the glass substrate may be strengthened. In one or more embodiments, the glass substrate may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, the glass substrate may be strengthened mechanically by utilizing a mismatch of the coefficient of thermal expansion between portions of the article to create a compressive stress region and a central region exhibiting a tensile stress. In some embodiments, the glass substrate may be strengthened thermally by heating the glass to a temperature below the glass transition point and then rapidly quenching.

In one or more embodiments, the glass substrate may be chemically strengthening by ion exchange. In the ion exchange process, ions at or near the surface of the glass substrate are replaced by—or exchanged with—larger ions having the same valence or oxidation state. In those embodiments in which the glass substrate comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass substrate generate a stress.

Ion exchange processes are typically carried out by immersing a glass substrate in a molten salt bath (or two or more molten salt baths) containing the larger ions to be exchanged with the smaller ions in the glass substrate. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass substrate in a salt bath (or baths), use of multiple salt baths, additional steps such as annealing, washing, and the like, are generally determined by the composition of the glass substrate (including the structure of the article and any crystalline phases present) and the desired DOC and CS of the glass substrate that results from strengthening. Exemplary molten bath composition may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass substrate thickness, bath temperature and glass (or monovalent ion) diffusivity. However, temperatures and immersion times different from those described above may also be used.

In one or more embodiments, the glass substrates may be immersed in a molten salt bath of 100% $NaNO_3$, 100% $KNO_3$, or a combination of $NaNO_3$ and $KNO_3$ having a temperature from about 370° C. to about 480° C. In some embodiments, the glass substrate may be immersed in a molten mixed salt bath including from about 5% to about 90% $KNO_3$ and from about 10% to about 95% $NaNO_3$. In one or more embodiments, the glass substrate may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass substrate may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass substrate. The spike may result in a greater surface CS value. This spike can be achieved by single bath or multiple baths, with the bath(s) having a single composition or mixed composition, due to the unique properties of the glass compositions used in the glass substrates described herein.

In one or more embodiments, where more than one monovalent ion is exchanged into the glass substrate, the different monovalent ions may exchange to different depths within the glass substrate (and generate different magnitudes stresses within the glass substrate at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass substrate. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass substrate is chemically strengthened by an ion exchange treatment, FSM or SCALP may be used depending on which ion is exchanged into the glass substrate. Where the stress in the glass substrate is generated by exchanging potassium ions into the glass substrate, FSM is used to measure DOC. Where the stress is generated by exchanging sodium ions into the glass substrate, SCALP is used to measure DOC. Where the stress in the glass substrate is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by FSM. Central tension or CT is the maximum tensile stress and is measured by SCALP.

In one or more embodiments, the glass substrate maybe strengthened to exhibit a DOC that is described a fraction of the thickness t of the glass substrate (as described herein). For example, in one or more embodiments, the DOC may be equal to or greater than about 0.05 t, equal to or greater than about 0.1 t, equal to or greater than about 0.11 t, equal to or greater than about 0.12 t, equal to or greater than about 0.13 t, equal to or greater than about 0.14 t, equal to or greater than about 0.15 t, equal to or greater than about 0.16 t, equal to or greater than about 0.17 t, equal to or greater than about 0.18 t, equal to or greater than about 0.19 t, equal to or greater than about 0.2 t, equal to or greater than about 0.21 t. In some embodiments, The DOC may be in a range from about 0.08 t to about 0.25 t, from about 0.09 t to about 0.25 t, from about 0.18 t to about 0.25 t, from about 0.11 t to about 0.25 t, from about 0.12 t to about 0.25 t, from about 0.13 t to about 0.25 t, from about 0.14 t to about 0.25 t, from about 0.15 t to about 0.25 t, from about 0.08 t to about 0.24 t, from about 0.08 t to about 0.23 t, from about 0.08 t to about 0.22 t, from about 0.08 t to about 0.21 t, from about 0.08 t to about 0.2 t, from about 0.08 t to about 0.19 t, from about 0.08 t to about 0.18 t, from about 0.08 t to about 0.17 t, from about 0.08 t to about 0.16 t, or from about 0.08 t to about 0.15 t. In some instances, the DOC may be about 20 µm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm.

In one or more embodiments, the strengthened glass substrate may have a CS (which may be found at the surface or a depth within the glass substrate) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass substrate may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa.

Suitable glass compositions for use in the glass substrate include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises SnO2 in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

As used herein, the term "cold-formed" or "cold-forming" refers to curving the glass substrate at a cold-form temperature which is less than the softening point of the glass (as described herein). A feature of a cold-formed glass substrate is asymmetric surface compressive between the first major surface 152 and the second major surface 154. In one or more embodiments, prior to the cold-forming process or being cold-formed, the respective compressive stresses in the first major surface 152 and the second major surface 154 of the glass substrate are substantially equal. In one or more embodiments in which the glass substrate is unstrengthened, the first major surface 152 and the second major surface 154 exhibit no appreciable compressive stress, prior to cold-forming. In one or more embodiments in which the glass substrate is strengthened (as described herein), the first major surface 152 and the second major surface 154 exhibit substantially equal compressive stress with respect to one another, prior to cold-forming. In one or more embodiments, after cold-forming, the compressive stress on the first major surface 152 increases (i.e., the compressive stress on the first major surface 152 is greater after cold-forming than before cold-forming). Without being bound by theory, the cold-forming process increases the compressive stress of the glass substrate being shaped to compensate for tensile stresses imparted during bending and/or forming operations. In one or more embodiments, the cold-forming process causes the first major surface 152 to experience compressive stresses, while the second major surface 154 experiences tensile stresses.

When a strengthened glass substrate is utilized, the first major surface and the second major surface (152, 154) are already under compressive stress, and thus the second major surface can experience greater tensile stress without risking fracture. This allows for the strengthened glass substrate to conform to more tightly curved surfaces.

In one or more embodiments, the thickness of the glass substrate is tailored to allow the glass substrate to be more flexible to conform to the shape of the curved surface 120. Moreover, a thinner glass substrate 150 may deform more readily to compensate for shape mismatches and gaps created by the shape of the curved surface 120. In one or more embodiments, a thin and strengthened glass substrate 150 exhibits greater flexibility especially during cold-forming. In one or more embodiments, the glass substrate 150 conforms to the curved surface 120 to provide a substantially uniform distance between the second major surface 152 and the curved surface 120 (which may be optionally filled with an adhesive).

In one or more embodiments, the cold-formed glass substrate and the curved surface have a compound curve including a major radius and a cross curvature. A complexly curved cold-formed glass substrate and the curved surface according to one or more embodiments may have a distinct radius of curvature in two independent directions. According to one or more embodiments, the complexly curved cold-formed glass substrate and the curved surface may thus be characterized as having "cross curvature," where the cold-formed glass substrate and the curved surface are curved along an axis (i.e., a first axis) that is parallel to a given dimension and also curved along an axis (i.e., a second axis) that is perpendicular to the same dimension. The curvature of the cold-formed glass substrate and the curved surface can be even more complex when a significant minimum radius is combined with a significant cross curvature, and/or depth of bend.

In one or more embodiments, the either one of or both the first major surface and the second major surface comprises a surface treatment. The surface treatment may cover at least a portion of the first major surface and the second major surface. Exemplary surface treatments include an anti-glare surface, an anti-reflective surface, a haptic surface, and a pigment design. In one or more embodiments, the at least a portion of the first major surface and/or the second major surface may include any one, any two or all three of an anti-glare surface, an anti-reflective surface, a haptic surface, and a pigment design. For example, first major surface may include an anti-glare surface and the second major surface may include an anti-reflective surface. In another example, the first major surface includes an anti-reflective surface and the second major surface includes an anti-glare surface. In yet another example, the first major surface comprises either one of or both the anti-glare surface and the anti-reflective surface, and the second major surface includes the pigment design. In one or more embodiments, the first major surface comprises one or more of an anti-glare surface, an anti-reflective surface, and a haptic surface. As used here, haptic surface refers to raised portions or textured portions of the surface that provides tactile feedback to a user's finger indicating a touch function or some other indicia.

The pigment design may include any aesthetic design formed from a pigment (e.g., ink, paint and the like) and can include a wood-grain design, a brushed metal design, a graphic design, a portrait, or a logo. The pigment design may be printed onto the glass substrate. In one or more embodiments, the anti-glare surface includes an etched surface. In one or more embodiments, the anti-reflective surface includes a multi-layer coating.

In one or more embodiments, the surface treatment (i.e., the anti-glare surface, the anti-reflective surface, haptic surface and/or the pigment design) is disposed on at least a portion of the periphery 180 and the interior portion 190 is substantially free of the surface treatment.

In one or more embodiments, the glass substrate may include an opening 195. As shown in FIG. 4, the opening can provide access to a button, knob and/or vent disposed on the underlying curved surface. In one or more embodiments, the display is visible through the opening (not shown). In one or more embodiments, the display is visible through the glass substrate.

Figure 6:
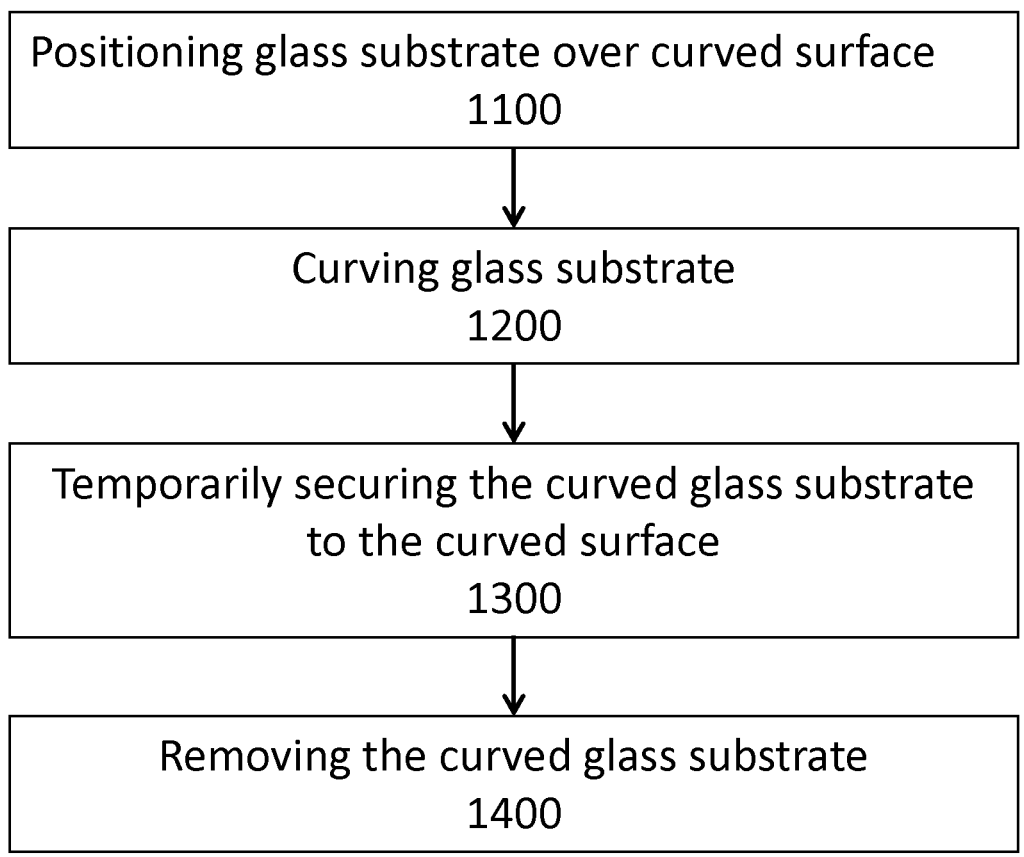
FIG. 6 is a process flowchart corresponding to one or more embodiments of the method for forming a glass-covered vehicle interior system.
Figure 7:
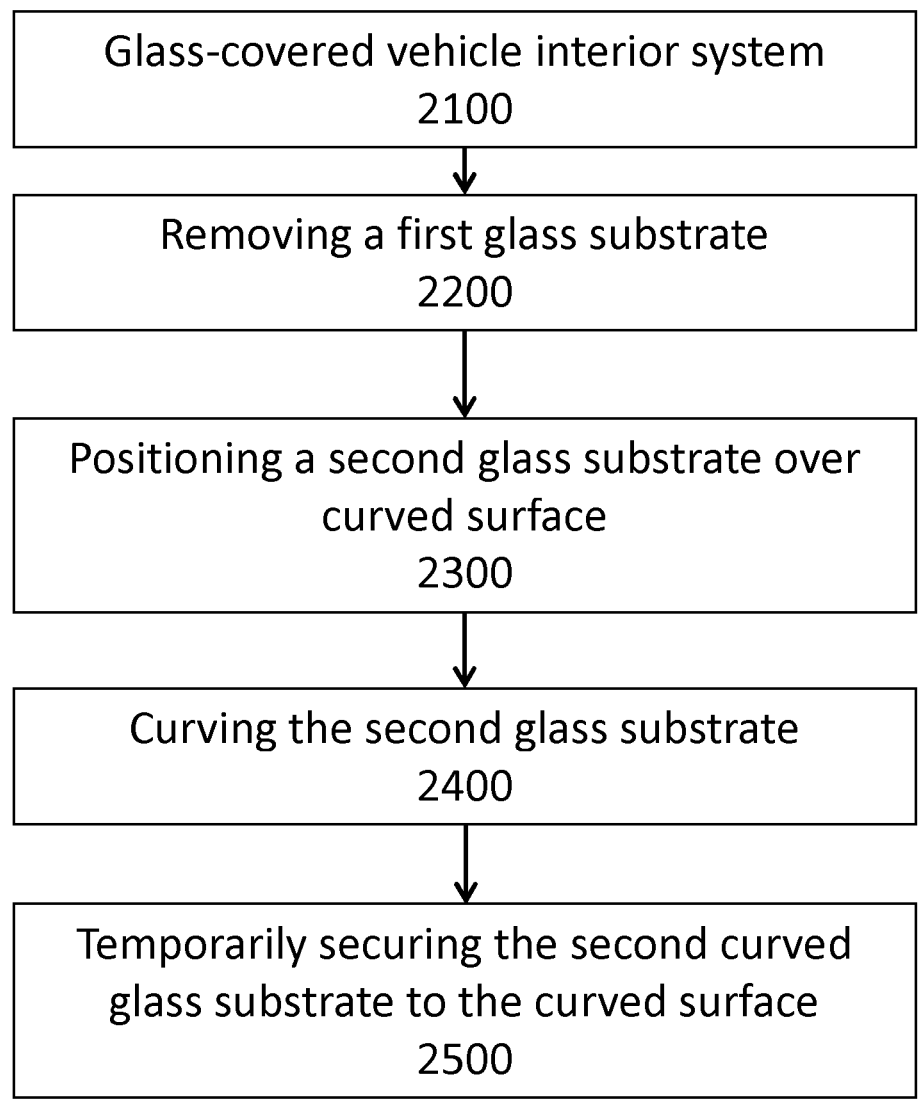
FIG. 7 is a process flowchart corresponding to one or more embodiments of the method for replacing a glass substrate in a glass-covered vehicle interior system.

A second aspect of this disclosure pertains to a method for forming a glass-covered vehicle interior system 1000, as illustrated in FIG. 6. In one or more embodiments, the method includes positioning a glass substrate over a curved surface of a base 1100 (which has a first radius of curvature), curving the glass substrate to form a curved glass substrate 1200 (which has a second radius of curvature that is within 10% of the first radius of curvature), and temporarily securing the curved glass substrate to the curved surface 1300. The various embodiments of the method may be used when the base includes any one of a center console, a dashboard, an arm rest, a pillar, a seat back, a floor board, a headrest, a door panel, and a steering wheel. The curved surface may include a display, and positioning the glass substrate over the curved surface includes positioning the glass substrate at least partially over the display.

In one or more embodiments, the glass substrate has a softening point and curving the glass substrate 1200 and temporarily securing 1300 the curved glass substrate is performed at a cold-forming temperature that is less than the softening point of the glass substrate. For example, the cold-forming temperature is less than 500° C. In another example, the cold-forming temperature is room temperature. In one or more embodiments, the cold-forming temperature is in a range from about 15° C. to about 500° C., from about 20° C. to about 500° C., from about 25° C. to about 500° C., from about 30° C. to about 500° C., from about 40° C. to about 500° C., from about 50° C. to about 500° C., from about 60° C. to about 500° C., from about 70° C. to about 500° C., from about 80° C. to about 500° C., from about 90° C. to about 500° C., from about 100° C. to about 500° C., from about 15° C. to about 400° C., from about 15° C. to about 300° C., from about 15° C. to about 200° C., from about 15° C. to about 100° C., from about 15° C. to about 70° C., or from about 15° C. to about 50° C.

The glass substrate includes a first major surface, a second major surface opposing the first major surface and a minor surface connecting the first major surface and the second major surface. The glass substrate may have a thickness (t), width (W), and a length (L) as described herein with respect to embodiments of a vehicle interior system described herein. In one or more embodiments, glass substrate is strengthened, as described herein.

In one or more embodiments, curving the glass substrate 1200 may include applying pressure to at least a portion of the glass substrate. For example, the method includes applying pressure to a portion of the first major surface until the second major surface is adjacent or in contact with the curved surface, as shown by X in FIGS. 3A and 3B. In one or more embodiments, temporarily securing 1300 comprises securing the glass substrate to the curved surface such that a force of 1 N/cm or greater is required to peel the glass substrate from the curved surface using Test Method F of ASTM D 3330 Test for Peel Adhesion of Pressure-Sensitive Adhesive Tape. For example, the peel force may be about 1.5 N/cm or greater, 2 N/cm or greater, 2.5 N/cm or greater, 3 N/cm or greater, 3.5 N/cm or greater, 4 N/cm or greater, 4.5 N/cm or greater, or 5 N/cm or greater as measured by Test Method F of ASTM D 3330 Test for Peel Adhesion of Pressure-Sensitive Adhesive Tapes. In one or more embodiments, the peel force required to peel the glass substrate from the curved surface is less than 20 N/cm, or less than about 10 N/cm.

In one or more embodiments, temporarily securing the glass substrate to the curved surface 1300 includes applying a releasable mechanical force on at least a portion of the first major surface. For example, temporarily securing the glass substrate includes inserting the glass substrate into the recess 160 in the curved surface and applying the releasable mechanical force on the at least a portion of the first major surface. In one or more embodiments, the releasable mechanical force is applied by a clamp. The clamp may form the recess 160 and then may exert contact or force on the first major surface to push the second major surface toward the curved substrate. In one or more embodiments, the clamp grips the portion of the glass substrate while exerting the contact or force on the first major surface.

In one or more embodiments, the method includes simultaneously curving the glass substrate 1200 and temporarily securing the curved glass substrate 1300. In one or more embodiments, the method includes sequentially first curving the glass substrate 1200 and then temporarily securing the curved glass substrate 1300.

In one or more embodiments, either one of or both the curved surface and the glass substrate (specifically, the second major surface) includes an adhesive as described herein with respect to the vehicle interior system embodiments. In one or more embodiments, temporarily securing the curved glass substrate to the curved surface includes creating a releasable bond between the curved glass substrate and the curved surface using the adhesive. The adhesive may be disposed between the second major surface and the curved surface. In one or more embodiments, either one of or both the curved surface and the glass substrate are substantially free of any adhesive.

In one or more embodiments, either one of or both the first major surface and the second major surface comprises a surface treatment, as described herein with respect to the vehicle interior system embodiments. As described herein, the surface treatment covers at least a portion of the first major surface and/or the second major surface of the glass substrate. The method of one or more embodiments may include forming the surface treatment on at least a portion of the first major surface and/or the second major surface of the glass substrate.

In one or more embodiments, the method includes removing the curved glass substrate from the curved surface 1400. In such embodiments, removing the curved glass substrate can include releasing the releasable mechanical force. In some embodiments, removing the curved glass substrate can include peeling the curved glass substrate from the curved surface by hand. In one or more embodiments, the method includes replacing the curved glass substrate with a second glass substrate.

A third aspect of this disclosure pertains to a method for replacing a glass substrate in a glass-covered vehicle interior system 2000. In one or more embodiments, the method includes providing a first glass-covered vehicle interior system as described herein (e.g., including a first glass substrate that is temporarily secured to a curved surface of a base, which includes a first radius of curvature) 2100, removing the first glass substrate from the curved surface 2200, positioning a second glass substrate over the curved surface 2300, curving the second glass substrate to form a second curved glass substrate (which includes a second radius of curvature that is within 10% of the first radius of curvature) 2400, and temporarily securing the second curved glass substrate to the curved surface 2500. In one or more embodiments the curved surface comprises a display, and positioning the second glass substrate over the curved surface comprises positioning the second glass substrate at least partially over the display.

In one or more embodiments, the first glass substrate that is removed is curved and has a radius of curvature that is within 10% of the first radius of curvature.

In one or more embodiments, the second glass substrate includes a softening point and curving the second glass substrate 2400 and temporarily securing the second curved glass substrate 2500 is performed at a cold-forming temperature (as described herein). In one or more embodiments, curving the second glass 2400 substrate and temporarily securing the second curved glass substrate 2500 can be performed as described according to the embodiments of curving the glass substrate 1200 and temporarily securing the curved glass substrate 1300 described herein. In one or more embodiments, the method includes simultaneously curving the second glass substrate 2400 and temporarily securing the second curved glass substrate 2500. In one or more embodiments, the method includes sequentially first curving the second glass substrate 2400 and then temporarily securing the second curved glass substrate 2500.

The second glass substrate includes a first major surface, a second major surface opposing the first major surface and a minor surface connecting the first major surface and the second major surface. The second glass substrate may have a thickness (t), width (W), and a length (L) as described herein with respect to embodiments of a vehicle interior system described herein. In one or more embodiments, second glass substrate is strengthened, as described herein. In one or more embodiments, the method includes removing the second curved glass substrate from the curved surface. In one or more embodiments, the second curved glass substrate may be removed by releasing the releasable mechanical force. In another example, removing the second curved glass substrate includes peeling the curved glass substrate from the curved surface by hand.

In one or more embodiments, either one of or both the curved surface and the second glass substrate (specifically, the second major surface) includes an adhesive as described herein with respect to the vehicle interior system embodiments. In one or more embodiments, temporarily securing the second curved glass substrate to the curved surface includes creating a releasable bond between the curved glass substrate and the curved surface using the adhesive, as described herein with respect to method 1000. The adhesive may be disposed between the second major surface and the curved surface. In one or more embodiments, either one of or both the curved surface and the glass substrate are substantially free of any adhesive.

In one or more embodiments, either one of or both the first major surface and the second major surface of the second glass substrate comprises a surface treatment, as described herein with respect to the vehicle interior system embodiments. As described herein, the surface treatment covers at least a portion of the first major surface and/or the second major surface of the glass substrate. The method of one or more embodiments may include forming the surface treatment on at least a portion of the first major surface and/or the second major surface of the glass substrate.

Aspect (1) of this disclosure pertains to a vehicle interior system comprising: a base including a curved surface; and a cold-formed glass substrate removably disposed on the curved surface, wherein the curved surface and the glass substrate each have a radius of curvature within 10% of one another.

Aspect (2) pertains to the vehicle interior system of Aspect (1), wherein the base comprises any one of a center console, a dashboard, an arm rest, a pillar, a seat back, a floor board, a headrest, a door panel, and a steering wheel.

Aspect (3) pertains to the vehicle interior system of Aspect (1) or Aspect (2), wherein the curved surface comprises a display, and the glass substrate is disposed at least partially over the display.

Aspect (4) pertains to the vehicle interior system of any one of Aspects (1) through (3), wherein the glass substrate comprises a first major surface, a second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, and wherein the thickness is 1.5 mm or less.

Aspect (5) pertains to the vehicle interior system of Aspect (4), wherein the width is in a range from about 5 cm to about 250 cm, and the length is from about 5 cm to about 250 cm.

Aspect (6) pertains to the vehicle interior system of any one of Aspects (1) through (5), wherein the glass substrate is strengthened.

Aspect (7) pertains to the vehicle interior system of any one of Aspects (1) through (6), wherein the base comprises at least one recess and the cold-formed glass is partially inserted into the recess and removably disposed on the curved surface.

Aspect (8) pertains to the vehicle interior system of any one of Aspects (1) through (7), wherein either one of or both the curved surface and the glass substrate comprises an adhesive.

Aspect (9) pertains to the vehicle interior system of Aspect (8), wherein the adhesive is pressure-sensitive.

Aspect (10) pertains to the vehicle interior system of Aspect (8) or Aspect (9), wherein the adhesive is disposed between the second major surface and the curved surface.

Aspect (11) pertains to the vehicle interior system of any one of Aspects (8) through (10), wherein the display is substantially free of the adhesive.

Aspect (12) pertains to the vehicle interior system of any one of Aspects (8) through (11), wherein the adhesive is disposed on the curved surface surrounding the display.

Aspect (13) pertains to the vehicle interior system of any one of Aspects (8) through (12), wherein the second major surface comprises a periphery adjacent the minor surface, and the adhesive is disposed between the periphery of the second major surface and the curved surface.

Aspect (14) pertains to the vehicle interior system of Aspect (13), wherein the periphery surrounds an interior portion of the second major surface, and the display is positioned at least partially within the interior portion of the second major surface.

Aspect (15) pertains to the vehicle interior system of any one of Aspects (1) through (7), wherein either one of or both the curved surface and the glass substrate are substantially free of any adhesive.

Aspect (16) pertains to the vehicle interior system of any one of Aspects (1) through (15), wherein either one of or both the first major surface and the second major surface comprises a surface treatment.

Aspect (17) pertains to the vehicle interior system of Aspect (16), wherein the surface treatment covers at least a portion of the first major surface and the second major surface.

Aspect (18) pertains to the vehicle interior system of Aspect (16) or Aspect (17), wherein the surface treatment comprises any one of an anti-glare surface, an anti-reflective surface, a haptic surface, and a pigment design.

Aspect (19) pertains to the vehicle interior system of Aspect (18), wherein the surface treatment comprises at least two of any one of an anti-glare surface, an anti-reflective surface, a haptic surface, and a pigment design.

Aspect (20) pertains to the vehicle interior system of Aspect (19), wherein the first major surface comprises the anti-glare surface and the second major surface comprises the anti-reflective surface.

Aspect (21) pertains to the vehicle interior system of Aspect (19), wherein the first major surface comprises the anti-reflective surface and the second major surface comprises the anti-glare surface.

Aspect (22) pertains to the vehicle interior system of Aspect (19), wherein the first major surface comprises either one of or both the anti-glare surface and the anti-reflective surface.

Aspect (23) pertains to the vehicle interior system of Aspect (19), wherein the pigment design is disposed on at least a portion of the periphery and the interior portion is substantially free of the pigment design.

Aspect (24) pertains to the vehicle interior system of any one of Aspects (18) through (23), wherein the pigment design comprises any one of a wood-grain design, a brushed metal design, a graphic design, a portrait, and a logo.

Aspect (25) pertains to the vehicle interior system of any one of Aspects (18) through (24), wherein the anti-glare surface comprises an etched surface, and wherein the anti-reflective surface comprises a multi-layer coating.

Aspect (26) pertains to the vehicle interior system of any one of Aspects (1) through (25), further comprising touch functionality.

Aspect (27) pertains to the vehicle interior system of any one of Aspects (1) through (26), wherein the glass substrate comprises an opening.

Aspect (28) pertains to the vehicle interior system of Aspect (27), wherein the display is visible through the opening.

Aspect (29) pertains to the vehicle interior system of Aspect (27), wherein the curved surface comprises any one of a button, knob and vent, that is accessible through the opening.

Aspect (30) pertains to the vehicle interior system of any one of Aspects (1) through (29), wherein the vehicle is any one of an automobile, a seacraft, and an aircraft.

Aspect (31) of this disclosure pertains to a method for forming a glass-covered vehicle interior system comprising: positioning a glass substrate over a curved surface of a base, wherein the curved surface comprises a first radius of curvature; curving the glass substrate to form a curved glass substrate comprising a second radius of curvature that is within 10% of the first radius of curvature; and temporarily securing the curved glass substrate to the curved surface.

Aspect (32) pertains to the method of Aspect (31), wherein the glass substrate comprises a softening point and curving the glass substrate and temporarily securing the curved glass substrate is performed at a cold-forming temperature that is less than the softening point of the glass substrate.

Aspect (33) pertains to the method of Aspect (32), wherein the cold-forming temperature is less than 500° C.

Aspect (34) pertains to the method of Aspect (32) or Aspect (33), wherein the cold-forming temperature is room temperature.

Aspect (35) pertains to the method of any one of Aspects (31) through (34), wherein curving the glass substrate comprising applying pressure to at least a portion of the glass substrate.

Aspect (36) pertains to the method of Aspect (35), wherein the glass substrate comprises a first major surface, a second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, and wherein the pressure is applied to the first major surface until the second major surface is adjacent or in contact with the curved surface.

Aspect (37) pertains to the method of any one of Aspects (31) through (36), wherein temporarily securing comprises securing the glass substrate to the curved surface such that a force of 1 N/cm or greater is required to peel the glass substrate from the curved surface using Test Method F of ASTM D 3330 Test for Peel Adhesion of Pressure-Sensitive Adhesive Tape.

Aspect (38) pertains to the method of Aspect (37), wherein the force is less than 20 N/cm.

Aspect (39) pertains to the method of Aspect (37) or Aspect (38), wherein temporarily securing the glass substrate comprises applying a releasable mechanical force on at least a portion of the first major surface.

Aspect (40) pertains to the method of Aspect (39), wherein temporarily securing the glass substrate comprises inserting the glass substrate into a recess in the curved surface and applying the releasable mechanical force on the at least a portion of the first major surface.

Aspect (41) pertains to the method of Aspect (39) or Aspect (40), wherein the releasable mechanical force is applied by a clamp.

Aspect (42) pertains to the method of any one of Aspects (31) through (41), further comprising removing the curved glass substrate from the curved surface.

Aspect (43) pertains to the method of Aspect (42), wherein removing the curved glass substrate comprises releasing the releasable mechanical force.

Aspect (44) pertains to the method of Aspect (42), wherein removing the curved glass substrate comprises peeling the curved glass substrate from the curved surface by hand.

Aspect (45) pertains to the method of any one of Aspects (31) through (44), wherein the base comprises any one of a center console, a dashboard, an arm rest, a pillar, a seat back, a floor board, a headrest, a door panel, and a steering wheel.

Aspect (46) pertains to the method of any one of Aspects (31) through (45), wherein the curved surface comprises a display, and positioning the glass substrate over the curved surface comprises positioning the glass substrate at least partially over the display.

Aspect (47) pertains to the method of any one of Aspects (31) through (46), wherein the thickness is 1.5 mm or less.

Aspect (48) pertains to the method of any one of Aspects (31) through (47), wherein the width is in a range from about 5 cm to about 250 cm, and the length is from about 5 cm to about 250 cm.

Aspect (49) pertains to the method of any one of Aspects (31) through (48), wherein the glass substrate is strengthened.

Aspect (50) pertains to the method of any one of Aspects (31) through (49), wherein either one of or both the curved surface and the glass substrate comprises an adhesive.

Aspect (51) pertains to the method of Aspect (50), wherein temporarily securing the curved glass substrate to the curved surface comprises creating a releasable bond between the curved glass substrate and the curved surface using the adhesive.

Aspect (52) pertains to the method of Aspect (50) or Aspect (51), wherein the adhesive is disposed between the second major surface and the curved surface.

Aspect (53) pertains to the method of any one of Aspects (31) through (49), wherein either one of or both the curved surface and the glass substrate are substantially free of any adhesive.

Aspect (54) pertains to the method of any one of Aspects (31) through (53), wherein either one of or both the first major surface and the second major surface comprises a surface treatment.

Aspect (55) pertains to the method of Aspect (54), wherein the surface treatment covers at least a portion of the first major surface and the second major surface.

Aspect (56) pertains to the method of Aspect (54) or Aspect (55), wherein the surface treatment comprises any one of an anti-glare surface, an anti-reflective surface, and a printed design.

Aspect (57) pertains to the method of any one of Aspects (31) through (56), wherein the vehicle is any one of an automobile, a seacraft, and an aircraft.

Aspect (58) pertains to the method of any one of Aspects (31) through (57), further replacing the curved glass substrate with a second glass substrate.

Aspect (59) of this disclosure pertains to a method for replacing a glass substrate in a glass-covered vehicle interior system comprising: providing a first glass-covered vehicle interior system comprising a first glass substrate that is temporarily secured to a curved surface of a base, wherein the curved surface comprises a first radius of curvature; removing the first glass substrate from the curved surface; positioning a second glass substrate over the curved surface; curving the second glass substrate to form a second curved glass substrate comprising a second radius of curvature that is within 10% of the first radius of curvature; and temporarily securing the second curved glass substrate to the curved surface.

Aspect (60) pertains to the method of Aspect (59), wherein the first glass substrate is curved and has a radius of curvature that is within 10% of the first radius of curvature.

Aspect (61) pertains to the method of Aspect (59) or Aspect (60), wherein the second glass substrate comprises a softening point and curving the second glass substrate and temporarily securing the second curved glass substrate is performed at a cold-forming temperature that is less than the softening point of the second glass substrate.

Aspect (62) pertains to the method of Aspect (61), wherein the cold-forming temperature is less than 500° C.

Aspect (63) pertains to the method of Aspect (61) or Aspect (62), wherein the cold-forming temperature is room temperature.

Aspect (64) pertains to the method of any one of Aspects (59) through (63), wherein curving the second glass substrate comprising applying pressure to at least a portion of the second glass substrate.

Aspect (65) pertains to the method of any one of Aspects (59) through (64), wherein the second glass substrate comprises a first major surface, a second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, and wherein the pressure is applied to the first major surface until the second major surface is adjacent or in contact with the curved surface.

Aspect (66) pertains to the method of any one of Aspects (59) through (65), wherein temporarily securing comprises creating a static force between the second glass substrate and the curved surface.

Aspect (67) pertains to the method of any one of Aspects (59) through (65), wherein temporarily securing comprises securing the second glass substrate to the curved surface such that a force of 2 N or greater is required to separate the second glass substrate from the curved surface.

Aspect (68) pertains to the method of Aspect (67), wherein securing the second glass substrate comprises applying a releasable mechanical force on a portion of the first major surface.

Aspect (69) pertains to the method of Aspect (67), wherein securing the second glass substrate comprises inserting the second glass substrate into a recess in the curved surface and applying the releasable mechanical force on the portion of the first major surface.

Aspect (70) pertains to the method of Aspect (68) or Aspect (69), wherein the releasable mechanical force is applied by a clamp.

Aspect (71) pertains to the method of any one of Aspects (59) through (70), further comprising removing the second curved glass substrate from the curved surface.

Aspect (72) pertains to the method of Aspect (71), wherein removing the second curved glass substrate comprises releasing the releasable mechanical force.

Aspect (73) pertains to the method of Aspect (71), wherein removing the second curved glass substrate comprises peeling the curved glass substrate from the curved surface by hand.

Aspect (74) pertains to the method of any one of Aspects (59) through (73), wherein the base comprises any one of a center console, a dashboard, an arm rest, a pillar, a seat back, a floor board, a headrest, a door panel, and a steering wheel.

Aspect (75) pertains to the method of any one of Aspects (59) through (74), wherein the curved surface comprises a display, and positioning the second glass substrate over the curved surface comprises positioning the second glass substrate at least partially over the display.

Aspect (76) pertains to the method of any one of Aspects (59) through (75), wherein the thickness is 1.5 mm or less.

Aspect (77) pertains to the method of any one of Aspects (59) through (76), wherein the width is in a range from about 5 cm to about 250 cm, and the length is from about 5 cm to about 250 cm.

Aspect (78) pertains to the method of any one of Aspects (59) through (77), wherein the second glass substrate is strengthened.

Aspect (79) pertains to the method of any one of Aspects (59) through (78), wherein either one of or both the curved surface and the second glass substrate comprises an adhesive.

Aspect (80) pertains to the method of Aspect (79), wherein temporarily securing the second curved glass substrate to the curved surface comprises creating a releasable bond between the second curved glass substrate and the curved surface using the adhesive.

Aspect (81) pertains to the method of Aspect (79) or Aspect (80), wherein the adhesive is disposed between the second major surface and the curved surface.

Aspect (82) pertains to the method of any one of Aspects (79) through (81), wherein either one of or both the curved surface and the glass substrate are substantially free of any adhesive.

Aspect (83) pertains to the method of any one of Aspects (59) through (82), wherein either one of or both the first major surface and the second major surface comprises a surface treatment.

Aspect (84) pertains to the method of Aspect (83), wherein the surface treatment covers at least a portion of the first major surface and the second major surface.

Aspect (85) pertains to the method of Aspect (83) or Aspect (84), wherein the surface treatment comprises any one of an anti-glare surface, an anti-reflective surface, and a printed design.

Aspect (86) pertains to the method of any one of Aspects (59) through (85), wherein the vehicle is any one of an automobile, a seacraft, and an aircraft.

It will be apparent to those skilled in the art that various modifications and variations can be made without departing from the spirit or scope of the invention.

What is claimed is:

1. A vehicle interior system comprising:
   a base including a curved surface; and
   a cold-formed glass substrate removably disposed on the curved surface, wherein the curved surface and the glass substrate each have a radius of curvature within 10% of one another,
   wherein the glass substrate comprises a first major surface, a second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, wherein the thickness is 1.5 mm or less, the width is in a range from about 5 cm to about 250 cm, and the length is from about 5 cm to about 250 cm.

2. The vehicle interior system of claim 1, wherein the base comprises any one of a center console, a dashboard, an arm rest, a pillar, a seat back, a floor board, a headrest, a door panel, and a steering wheel.

3. The vehicle interior system of claim 1, wherein the curved surface comprises a display, and the glass substrate is disposed at least partially over the display.

4. The vehicle interior system of claim 1, wherein the base comprises at least one recess and the cold-formed glass is partially inserted into the recess and removably disposed on the curved surface.

5. The vehicle interior system of claim 1, further comprising an adhesive disposed between the second major surface and the curved surface.

6. The vehicle interior system of claim 5, wherein the adhesive is pressure-sensitive.

7. The vehicle interior system of claim 1, wherein either one of or both the first major surface and the second major surface comprises a surface treatment, wherein the surface treatment covers at least a portion of the first major surface and the second major surface, and wherein the surface treatment comprises any one of an anti-glare surface, an anti-reflective surface, a haptic surface and a pigment design.

8. The vehicle interior system of claim 1, further comprising touch functionality.

9. The vehicle interior system of claim 1, wherein the glass substrate comprises an opening and wherein the curved surface comprises any one of a button, knob and vent, that is accessible through the opening.

10. The vehicle interior system of claim 6, wherein the pressure-sensitive adhesive secures the cold-formed glass substrate to the base such that a force of at least 1 N/cm as measured using Test Method F of ASTM D 3330 Test for Peel Adhesion of Pressure-Sensitive Tapes is required to peel the cold-formed glass substrate from the base.

11. The vehicle interior system of claim 10, wherein the force is no more than 20 N/cm.

12. The vehicle interior system of claim 11, wherein the force is no more than 10 N/cm.

13. The vehicle interior system of claim 1, wherein vehicle interior system is part of an automobile, a seacraft, or an aircraft.

14. The vehicle interior system of claim 1, wherein the cold-formed glass substrate comprises an opening.

15. The vehicle interior system of claim 14, wherein a display is visible through the opening.

16. The vehicle interior system of claim 1, wherein the radius of curvature of the curved surface is from 50 mm to 500 mm.

17. The vehicle interior system of claim 1, wherein the cold-formed glass substrate is strengthened.

18. The vehicle interior system of claim 7, wherein the first major surface comprises the anti-glare surface and the second major surface comprises the anti-reflective surface.

19. The vehicle interior system of claim 7, wherein the first major surface comprises one or both of the anti-glare surface and the anti-reflective surface.

* * * * *